UNITED STATES PATENT OFFICE.

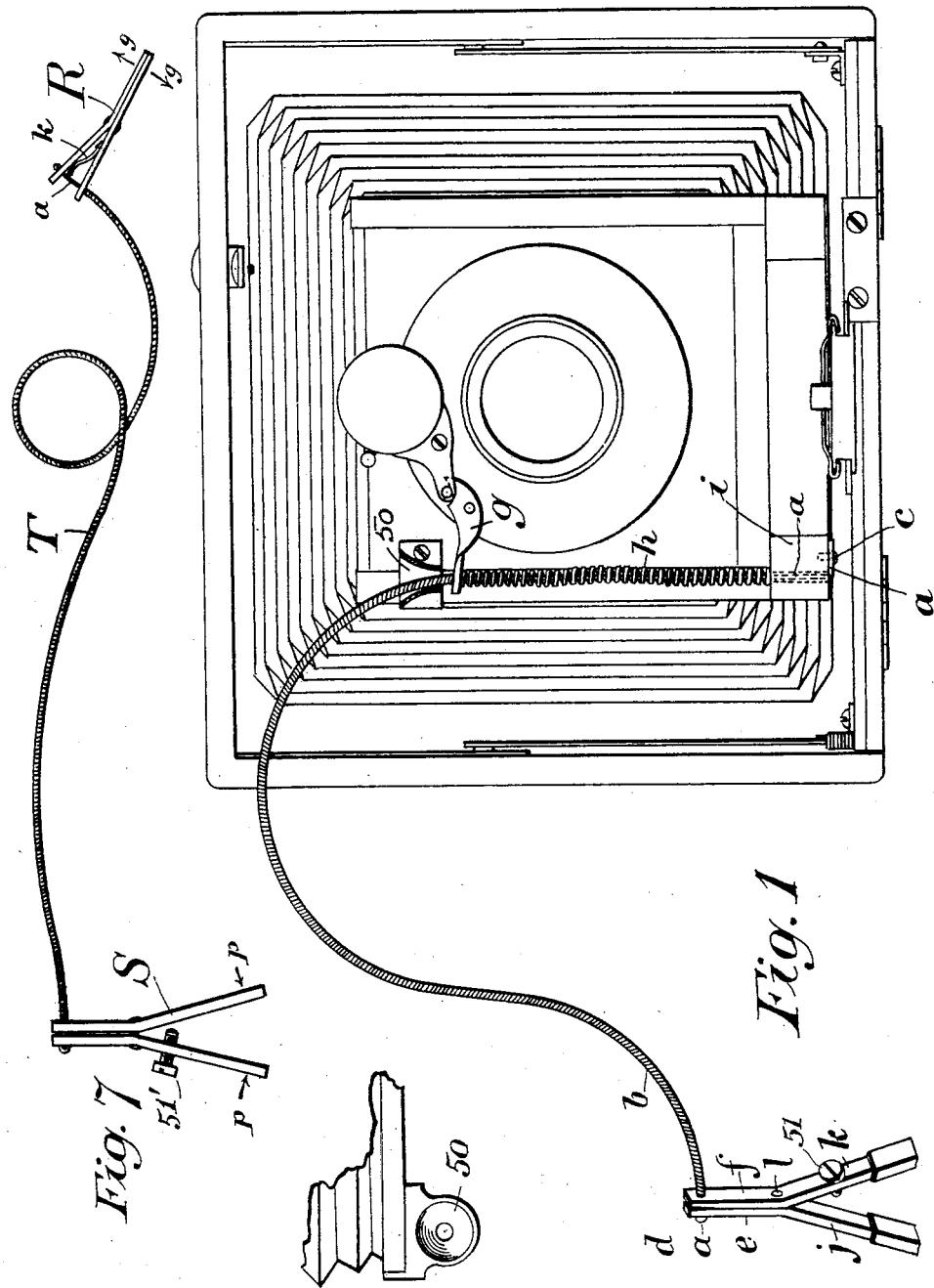

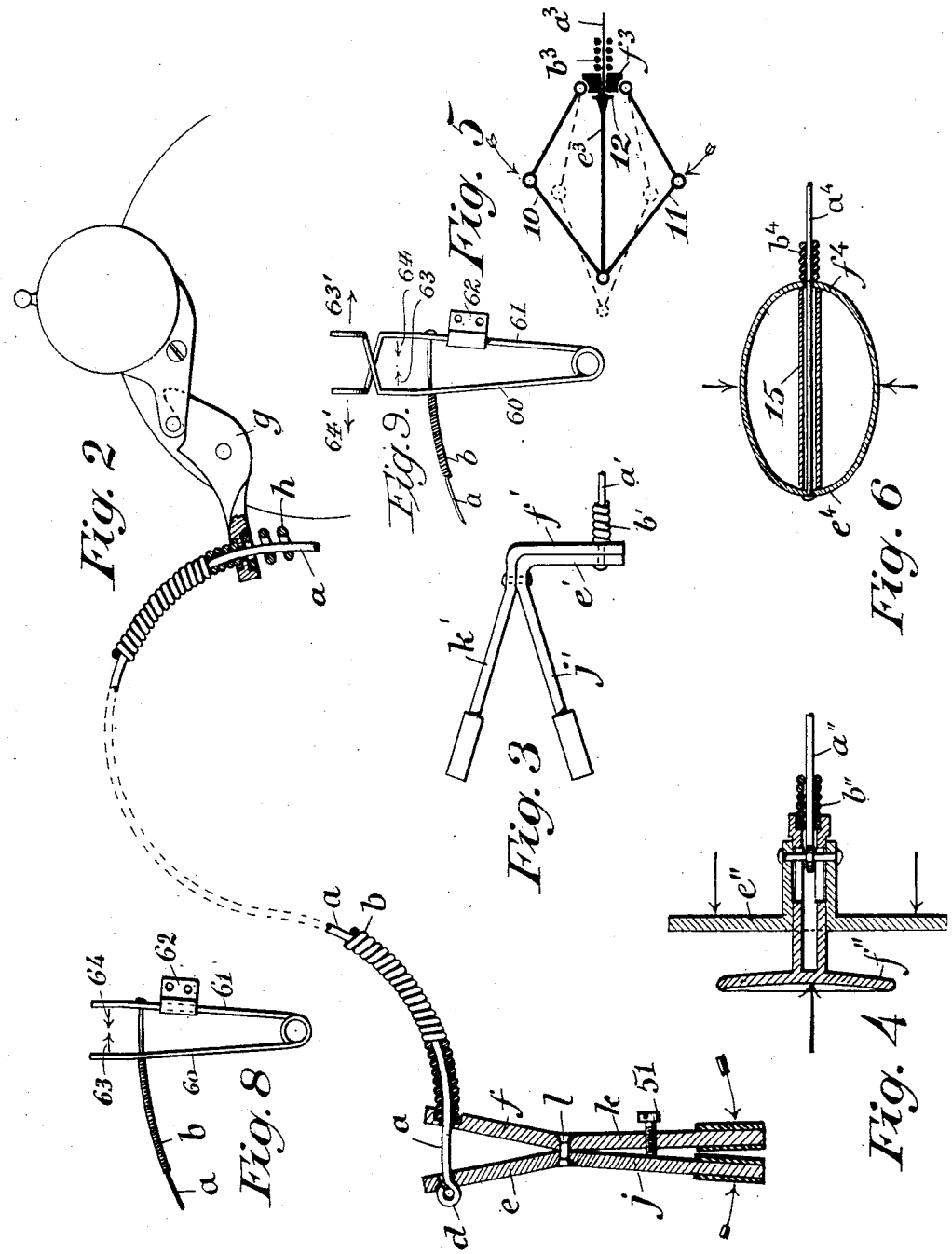

JOSEPH BECKER, OF WASHINGTON, DISTRICT OF COLUMBIA, ASSIGNOR TO EASTMAN KODAK COMPANY, OF ROCHESTER, NEW YORK, A CORPORATION OF NEW YORK.

CAMERA-SHUTTER-OPERATING MECHANISM.

975,497.   Specification of Letters Patent.   Patented Nov. 15, 1910.

Application filed June 26, 1901. Serial No. 66,159.

*To all whom it may concern:*

Be it known that I, JOSEPH BECKER, a citizen of the United States, and resident of Washington, District of Columbia, have invented certain new and useful Improvements in Camera-Shutter-Operating Mechanisms.

The object of my invention is to provide a camera shutter operating means that shall be a positively acting, compact and durable substitute for the rubber bulb and hose or pneumatic arrangement which is now generally used.

In the pneumatic system, when the bulb is pressed, the inclosed air is compressed to push against the part to be operated upon, but it also pushes in the opposite direction with equal force on the bulb and its hose, whence results in the hose a tensile stress exactly equal to the compressive stress of the air within. The camera and its parts are, therefore, subject to a pull on the part of the hose and to a push on the part of the air which are exactly balanced so there is no tendency to shake or disturb the apparatus as a whole. Moreover, the tension element or hose being connected with the camera frame and parts which are fixed no accidental jerk or pull on the hose can operate or set off the shutter or in any way injure the delicate movable parts thereof.

In my mechanical system the method of operation is exactly the same in principle; that is to say, that my system has no greater tendency to disturb the apparatus than the pneumatic system and that it owes this property to the fact that it also comprises a pulling element and a pushing element with the pulling element connected to the camera or shutter frame.

In my device the tension or pulling element is preferably a simple inextensible elastic wire, and the pushing or thrust element is a flexible but longitudinally incompressible closely fitting sheath which is preferably made by winding an annealed wire in close spires upon the tension element. This combination of core and sheath constitutes the flexible transmitting means which correspond to the hose and its contained air in the pneumatic system. This flexible and longitudinally rigid line is provided at one end with a sender or means for exerting simultaneously a pull on the core and a corresponding push on the sheath; and at the other end the line is connected by its pushing element to the trigger or part to be moved and by its other or pulling element to the stationary part of the apparatus which carries said part to be moved. The combination is completed by an automatic resetting device, which may be a spring or a weight, and which acts to return the parts to their normal position of rest as soon as pressure at the sending end is released.

Two preferred forms of my invention are illustrated in the accompanying drawings, in which:

Figure 1 represents a face view of a camera and its shutter to which my invention is applied. Fig. 1ª is a plan showing a detail fixture and the adjacent parts of the camera and Fig. 2, an enlarged detailed view partly in section. Figs. 3 to 6 are modifications of the sending means. Fig. 7 is a form complete in itself as an attachment, Fig. 8 shows a modified form of the receiver of Fig. 7, and Fig. 9 shows a second modified form.

The pulling or internal element, $a$, is a plain wire connected to the camera frame, and the pushing or external element, $b$, is a closely wound coil which bears against the trigger, $g$, of the camera. Element, $a$, is made of a relatively thick wire so that it shall be practically inextensible, as stated above, and should be of sufficient rigidity and elasticity to avoid short bends and permanent sets. This wire, $a$, has one end fixed at $c$, Fig. 1, to the part of the camera which carries the objective and its shutter and has its other end attached at $d$ to one of the two parts, $e$, of the sending means, $e, f$. The sheath or pushing member, $b$, is preferably an annealed wire of relatively small diameter; it has absolutely no lateral stiffness and does not need any. The unwinding of this sheath should be prevented by any suitable means, such as by inclosing its ends within recesses, as shown in Fig. 2. One end of the sheath bears against the trigger, $g$, and the other against member, $f$, of the transmitting means, $e, f$.

The resetting device consists of a helical spring $h$ resting at one end on a part, $i$, of the lens holding frame and bearing with its other end against the trigger, $g$. This resetting spring has two important functions; first, it serves, as stated before, to restore the parts to their original normal position when the operator has stopped pressing, and, secondly, it serves to firmly press together the spires of the push element, *b*, so that this element shall not be appreciably reduced in length when pressure is applied by the operator. As element, *b*, is incompressible and element, *a*, inextensible, it is clear that if *a* is pulled out of *b* through a given distance at the sending end it must move into *b* at the receiving or trigger end through exactly the same distance. The trigger, *g*, is set in its normal position by drawing wire, *a*, more or less through part, *i*, before fastening it at *c* and the extent of the motion of the trigger can be adjusted by a set-screw, 51, Fig. 2, or other equivalent means for limiting the spreading action in the sending means.

It is seen that my device permits of transmitting a motion of definite extent and location. The effort to transmit this motion is simply that necessary to move the trigger plus the tension in spring, *h*, which tension need not be greater than necessary to insure positive action, but can without affecting the extent of motion be as much greater as may be found desirable. While I have shown a helical spring, *h*, it is clear that any equivalent means for pushing against the push element will answer.

The sender, *e, f*, consists of any means for pulling on *a* and for simultaneously pushing on *b*. In the forms shown it comprises two bent levers, *je, kf*, pivoted at *l* and there connected by a loose rivet which is perpendicular to the pivotal axis. In the normal position, shown in Fig. 1, branches, *e* and *f*, are drawn into contact by the resetting spring, *h*. To operate the transmitter its ends, *j* and *k*, which are covered with rubber to prevent slipping, are pressed together, as shown in Fig. 2. This separates branches, *e* and *f*, and makes sheath, *b*, slide over core, *a*, and depresses the trigger by compressing spring, *h*. The pressure may, of course, be exerted in any manner, as, for instance, with the foot on the ground or between a thumb and index finger, or, as I have stated above, on account of the smallness of the device, even between the teeth. This last feature is very important in snap shot photography where it is desirable to have both hands free to steady the camera, and it is especially useful where one of the steadying hands must also be used to focus.

As any sudden accidental jerk on the flexible connection might injure the delicate shutter mechanism, and also, in order to avoid short bends of the tension element, I provide a bell-shaped socket attachment, 50, through which the flexible connection is passed. The socket alone avoids the kinking and sudden bends, but, in order that a violent pull on the sender as a whole shall not injure the delicate shutter mechanism or accidentally set it off when set, I have as explained above connected the pull element with the camera frame and made the push element act on the delicate trigger or release finger. This special arrangement, therefore, combines with the socket to avoid short bends in the transmission, injury to the delicate parts of the mechanism and accidental release of the shutter. Therefore, while the socket would be useful in combination with any flexible transmission, it is particularly useful, not to say indispensable, in combination with mine.

I shall now briefly describe a few modified forms of the sending means, each of which presents special advantages. Fig. 3 is the equivalent of the form of Fig. 1, with the levers bent to form bell cranks; and the object of this bending is to bring the operating arms in line with the flexible transmitting means, *a' b'*, so that the actuating pressure is applied transversely of the adjacent parts of the flexible transmission, instead of to one side and substantially parallel thereto as in Fig. 1. Fig. 4 is a second modification in which the push and pull are communicated directly by longitudinal stress; the push by pressure of the thumb on plate *f''*, and the pull by pressure of the index and middle finger on disk *e''*. The special advantage of this form of sender is that it does not require to be acted upon in a definite transverse direction like the others; as it has other valuable advantages, I have filed a separate application thereon, Serial No. 402,518, filed November 16, 1907. In Figs. 5 and 6 are shown forms which are analogous to the bulb of the pneumatic system in that the pressure to actuate these forms is applied substantially at right angles to the tension element of the flexible transmission. The form of Fig. 5 comprises two oppositely disposed toggle joints 10, 11, the further lateral spreading of which is prevented by a shoulder 12 formed on the rigid prolongation $e^3$ of the tension element $a^3$. In Fig. 6 the flexible ring $e^4 f^4$ answers the same purpose as the toggles in Fig. 5 and the tube 15 through which passes the tension element $a^4$ serves to limit the lateral spreading action of the sender.

My device may also be made complete in itself or self contained and in the form of an attachment to be easily adapted to any purpose and specially to any camera shutter.

The combination shown in Fig. 7 comprises a sender, S, of any preferred form, the flexible transmitter, T, and a receiver, R, to which is attached a spring, *k*. When pressure is applied on the sender as shown by the arrows, *p p*, the lower branches of the receiver spread as indicated by arrows, *q q*; and this spreading action can be utilized in many ways, either directly or indirectly, to operate a shutter. Shutters being as a rule spring operated, the device is most generally mounted to trip a shutter catch and allow the shutter to move under the action of its spring. The sender has an adjustable stop, 51′, to limit the extent of motion transmitted. Any other form of sender shown may be adapted to act as a receiver, as can readily be understood. If a closing action, instead of a spreading action, be desired at the receiving end, the upper branches of the receiver are used and the lower branches may be suppressed. The form of receiver shown is, however, more advantageous because it can be set to act with either end and, therefore, may be utilized to secure either a spreading or a closing action, as may be required.

I shall describe only one other form of receiver, which is shown in Fig. 8, as consisting of a U-shaped spring, 60, 61, formed by bending a spring wire as shown in the figure. The pull element, $a$, of the transmitter is connected with one branch, say, 61, and the push element, $b$, bears against the other branch, 60. One branch of the U is fixed to the shutter frame or camera by means of a clamp plate or bracket, 62. By fixing branch, 61, the motion obtained is to the right, as indicated by arrow, 63. By fixing branch, 60, instead, reversed motion to the left is secured, as shown by arrow, 64. By extending the ends and crossing them, as shown in Fig. 9, this receiver may be used either below the crossing point to exert a closing action or above said crossing point to exert a spreading action.

The self contained flexible push and pull transmission, comprising the combination of sender, flexible transmission and receiver, as a separate article of manufacture or attachment for operating or releasing camera shutters will not be claimed herein, as it forms the subject-matter of a separate application for Patent, Serial No. 548,530, filed March 11, 1910, as a division of the present application.

The thinner the wire used, the greater is the degree of flexibility obtained, and as the sender can be made very small, much smaller than the usual pneumatic bulbs, which must be large to allow for lost motion, my device can be very conveniently coiled out of the way into any small recess of the camera.

My device is a highly improved substitute for the common bulb and hose wherever and however used. It is principally advantageous where positive action is desired as in the self-setting shutters, and it is far superior to the bulb in making the so-called bulb exposures, in which the shutter finger must be kept pressed down during the full time of the exposure.

What I claim as my invention is:

1. In camera shutters, an actuating mechanism comprising the combination with means for exerting a push and an equal pull of positive means for transmitting the push to the operating finger of the shutter, and positive means for transmitting the pull to the camera or shutter frame.

2. In combination with a frame, having relatively light mechanism mounted thereon, a flexible push element adapted to bear against the light mechanism, and a flexible pull element inclosed in the push element and adapted to act on the frame.

3. The combination with a camera shutter and its operating finger, of a shutter actuating mechanism comprising a flexible tube for pushing upon the said finger and a wire inclosed in the tube and adapted to exert an equal and opposite effort on the camera or shutter frame.

4. A camera shutter operating mechanism comprising a flexible push element adapted to bear upon the part to be moved at the receiving end, and a tension element inclosed in the push element and attached at its receiving end to the frame which supports the movable parts.

5. The combination with a camera shutter and a finger adapted to be moved to bring about an actuation of the shutter; of a flexible tension element having one end attached in fixed relation to the shutter frame; a spring adapted to push the said finger along the said tension element in a direction away from its attached end; and, a flexible tube mounted on the tension element to bear on the said finger in opposition to the said spring.

6. The combination with a camera shutter and a finger adapted to be moved to bring about an actuation of the shutter; of a flexible tension element having one end attached in fixed relation to the shutter frame; a spring adapted to push the said finger along the said tension element in a direction away from its attached end; a flexible tube mounted on the tension element to bear on the said finger in opposition to the said spring; and means at the free end of the tube and tension element for simultaneously exerting a push on the said tube and an equal pull on the wire.

7. The combination with a camera shutter and a finger adapted to be moved to bring about an actuation of the shutter; of a flexible tension element passing through said finger and having its end attached in fixed relation to the shutter frame; and, a helical compression spring mounted upon the said tension element between its attached end and the said fingers.

8. In a camera having a shutter and shutter operating mechanism set in motion through a flexible transmission, a flaring socket through which the transmission is led to avoid short bends.

9. The combination with a camera shutter operating means of means for adjusting the extent of motion transmitted thereby.

10. The combination with a camera shutter operating means comprising a sender and a flexible transmission, of means in the sender for adjustably limiting the distance through which parts of the sender may be relatively moved.

11. The combination with a camera shutter operating means comprising a flexible and positive push and pull transmission of a sender for exerting thereon a push and an equal pull, and means in the sender for adjustably limiting the distance through which the parts of the sender may be relatively moved.

12. In a camera having a shutter and shutter operating mechanism comprising a flexible but positive push and pull transmission, means for connecting the pull element to a point in fixed relation with the shutter frame or camera and adapting the push element to bear upon the shutter release finger, a socket formed in a solid part of the shutter frame or camera, and through which the flexible transmission is led, whereby are avoided short bends of the transmission, injury to the delicate mechanism and accidental release of the shutter.

13. The combination with a flexible means for positively transmitting motion having a transversely flexible but longitudinally inextensible tension element closely bound throughout its length with a transversely flexible but longitudinally incompressible compression element, of a sender therefor comprising a part connected with the flexible pull element of the transmission, and a part connected with the push element of the transmission, so that the two connecting points shall be guided to move substantially along the geometrical axis of the said transmission, and opposed pressure surfaces arranged in the same general direction as the adjacent part of said geometrical axis to be pressed together transversely of the said geometrical axis, and mechanical connections between said pressure surfaces and said connecting points for converting said transverse motion of the pressure surfaces into the longitudinal motion of the connecting points.

14. The combination with a flexible means for positively transmitting motion having a transversely flexible but longitudinally inextensible tension element closely bound throughout its length with a transversely flexible but longitudinally incompressible compression element, of a sender therefor comprising a part connected with the flexible pull element of the transmission, and a part connected with the push element of the transmission, so that the two connecting points shall be guided to move substantially along the geometrical axis of the said transmission, one of said parts being bent to form an inside angle smaller than two right angles and the second part being pivoted to the first with its arms extending in the outer angle of said first part at an angle smaller than said outer angle of the first part, to provide pressure surfaces for separating the said connecting points.

15. The combination with a camera shutter and its operating or releasing finger, and means for exerting a push and an equal pull, of flexible means for positively transmitting said push and pull consisting of a transversely flexible but longitudinally incompressible compression element for positively transmitting the push to the said finger, and a transversely flexible but longitudinally inextensible tension element closely bound throughout its length with the said flexible compression element and connected to a point in fixed relation to the camera or shutter frame for transmitting the pull to said frame.

JOSEPH BECKER.

Witnesses:
M. E. COWELL,
GUY E. PADGETT.